(12) United States Patent
Savage

(10) Patent No.: US 10,705,685 B2
(45) Date of Patent: Jul. 7, 2020

(54) NAVIGATION SYSTEM FOR A GRAPHICAL USER INTERFACE

(71) Applicant: Red Hat, Inc., Raleigh, NC (US)

(72) Inventor: Peter Victor Savage, Farnborough (GB)

(73) Assignee: Red Hat, Inc., Raleigh, NC (US)

(*) Notice: Subject to any disclaimer, the term of this patent is extended or adjusted under 35 U.S.C. 154(b) by 183 days.

(21) Appl. No.: 15/690,622

(22) Filed: Aug. 30, 2017

(65) Prior Publication Data

US 2019/0065009 A1    Feb. 28, 2019

(51) Int. Cl.
| | | |
|---|---|---|
| *G06F 3/0482* | (2013.01) | |
| *G06F 9/451* | (2018.01) | |
| *G06F 3/0481* | (2013.01) | |
| *G06F 8/20* | (2018.01) | |
| *H04L 29/08* | (2006.01) | |
| *G06Q 30/06* | (2012.01) | |
| *G06F 8/38* | (2018.01) | |
| *G06F 8/34* | (2018.01) | |
| *G06F 17/00* | (2019.01) | |

(52) U.S. Cl.
CPC ............ *G06F 3/0482* (2013.01); *G06F 9/451* (2018.02); *G06F 3/0481* (2013.01); *G06F 8/20* (2013.01); *G06F 8/34* (2013.01); *G06F 8/38* (2013.01); *G06Q 30/0623* (2013.01); *H04L 67/1095* (2013.01)

(58) Field of Classification Search
CPC ........ G06F 3/0482; G06F 3/0481; G06F 8/20; G06F 8/34; G06F 8/38; G06F 9/48512; H04L 67/1095; G06Q 30/0623
See application file for complete search history.

(56) References Cited

U.S. PATENT DOCUMENTS

| | | |
|---|---|---|
| 7,627,563 B2 | 12/2009 | Wories |
| 9,064,220 B2 | 6/2015 | Brosche et al. |
| 9,164,653 B2 | 10/2015 | Keondjian et al. |
| 9,274,684 B2 | 3/2016 | Han et al. |
| 9,600,401 B1* | 3/2017 | Haischt ............... G06F 11/3664 |
| 2006/0015479 A1 | 1/2006 | Wood et al. |
| 2008/0162505 A1 | 7/2008 | Hill et al. |
| 2010/0146488 A1* | 6/2010 | Chen .................. G06F 16/9577 |
| | | 717/128 |

(Continued)

OTHER PUBLICATIONS

Savage, P., "Navmazing 1.1.2," Jan. 10, 2017 https://pypi.python.org/pypi/navmazing/1.1.2.

(Continued)

*Primary Examiner* — Quoc A Tran
(74) *Attorney, Agent, or Firm* — Kilpatrick Townsend & Stockton LLP

(57) ABSTRACT

A graphical user interface (GUI) can be tested using a navigation system to access objects. As an example, a processing device in a system can receive a selection of an object. The selection can be made through the GUI. In response to the selection, the processing device retrieves the object and a destination at which the object is located. The processing device recursively traverses a backwards navigation path from the destination to the graphical user interface using the name of the object and the destination. The processing device can then navigate to the destination using the backwards navigation path.

20 Claims, 5 Drawing Sheets

(56) References Cited

U.S. PATENT DOCUMENTS

| | | | |
|---|---|---|---|
| 2010/0251085 A1* | 9/2010 | Zearing | G06F 3/0482 715/205 |
| 2011/0016453 A1* | 1/2011 | Grechanik | G06F 11/368 717/125 |
| 2014/0282258 A1 | 9/2014 | Treskunov et al. | |

OTHER PUBLICATIONS

"Squish: Reliable GUI Test Automation that works," https://www.froglogic.com/squish/.

Amiel, R., "BigData Visual UI Testing using Decision Trees," May 10, 2016, https://www.linkedin.com/pulse/bigdata-visual-ui-testing-using-decision-trees-randy-amiel.

\* cited by examiner

NAVIGATION SYSTEM FOR A GRAPHICAL USER INTERFACE

TECHNICAL FIELD

The present disclosure relates generally to graphical user interfaces. More specifically, but not by way of limitation, this disclosure relates implementing navigation from a graphical user interface to specific location(s) where objects reside.

BACKGROUND

When a user of a graphical user interface (GUI) interacts with a GUI component (e.g., a button or menu), the GUI often navigates to a destination object that is related to the GUI component. In a typical operating environment, destinations and any navigation context are part of, or specified by, an application programming interface (API) to which the GUI is connected. However, in a test environment, if the API is not present or the real locations are not accessible, the test environment must "know" how to navigate to appropriate test destinations in some other way. One way to implement GUI navigation in a test environment is by establishing a lookup tree structure. In a lookup tree structure, leafs and nodes can be followed to navigate to appropriate destinations for objects, which may be models of actual hardware or programming objects that would be present in an actual user environment when the GUI is to be deployed.

DETAILED DESCRIPTION

Figure 1:
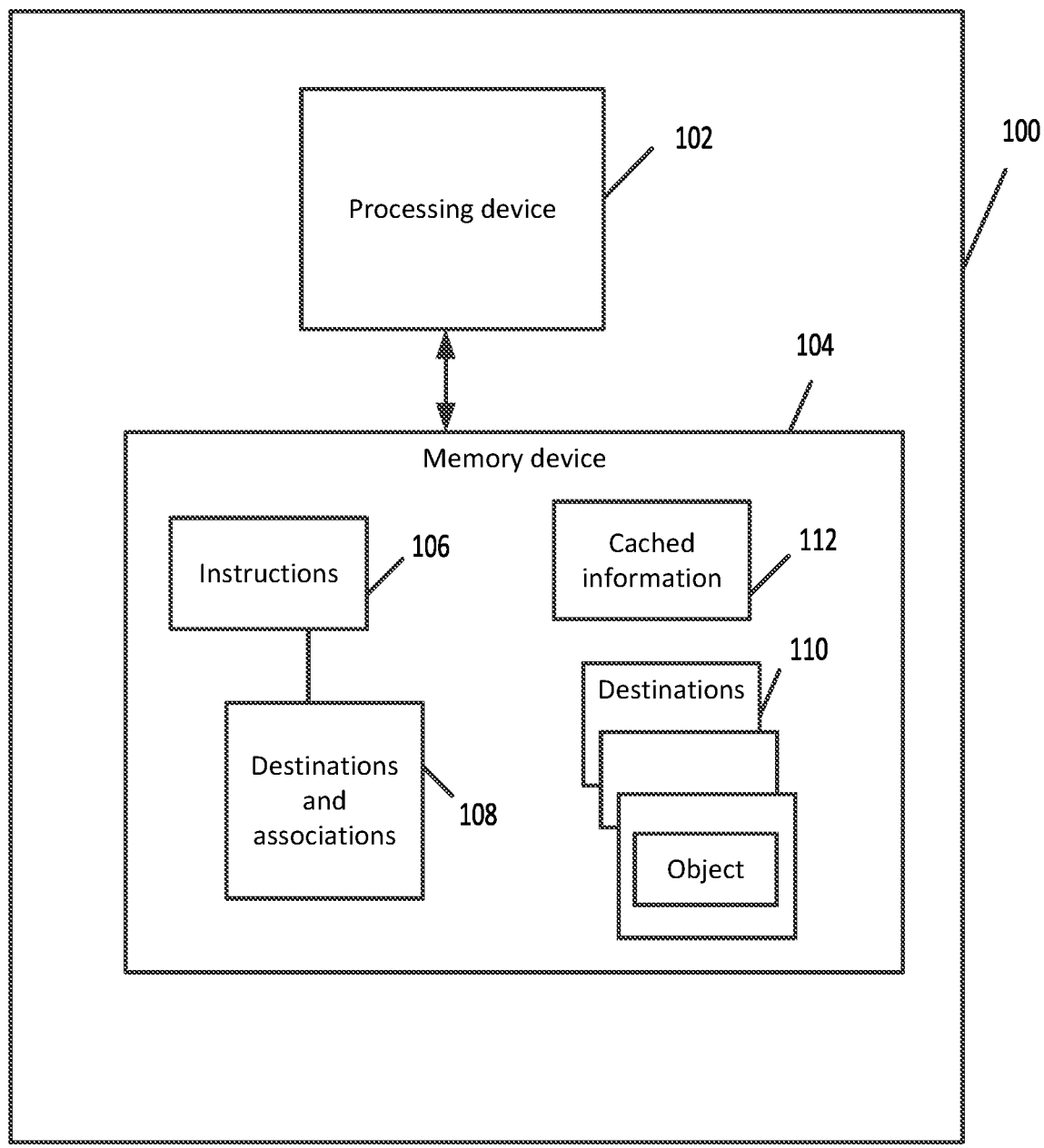
FIG. 1 is a block diagram of an example of a navigation system for a graphical user interface (GUI) according to some aspects.

It can be difficult for a developer or tester to fully test a graphical user interface (GUI) in a development environment. Navigation to a destination page or destination object in a test environment is often facilitated with a lookup tree structure. The lookup tree includes navigation destinations as string names. With such a tree structure, relatively large amounts of metadata are passed between objects. The metadata includes information to assist in the navigation, for example destination object names. When program versions change, the lookup tree is updated or supplemented. For a complex GUI, the lookup tree becomes very large and unwieldy, often requiring division into multiple files at multiple locations, which themselves take time to find and navigate to during GUI testing.

Some examples of the present disclosure overcome one or more of the abovementioned issues by registering each destination in the test system against a programming object that is from a registered class. A navigation object takes the destination name and works backwards from a destination as opposed to working towards the destination by referencing a lookup tree. The navigation object initially determines if the GUI is already pointing to the destination. If so, then there is no need to do additional navigation. So, no additional navigation is carried out, saving processing time. Otherwise, the navigation object performs the navigation to the destination. For example, a GUI can be organized in multiple nested menus. In such an example, the system starts at a destination menu with the object, navigates to a previous menu, determines if the previous menu is the current location, and repeats if necessary, recursively traversing a backwards navigation path. This process can be carried out quickly for each navigation. Thus, large, complex lookup trees are eliminated, reducing storage space needed in the test setup and improving processing time during testing.

Examples of the present disclosure address issues with lookup trees in a number of ways. Taking an object-oriented programming language as a base, model objects based on real hardware or program code from an environment that the GUI will ultimately operate in are created. The real hardware or code can be servers, users, databases, or even a component of the GUI itself, such as a menu or page. For example, if one were testing a system for providing user polling, an object such as a server object might be created for the server that would be used in the polling process. Other objects created might include a poll object, a vote object, and a user object. Each object has at least one associated navigation destination, but may have multiple associated destinations. For example, with the polling system, a vote object may have a details page and an edit page as destinations. The registration of destinations against objects may ensure that if an object is known, its destination or destinations will be loaded, and that no metadata needs to be transferred prior to initiating a navigation.

To navigate to a destination, a string can be supplied that has a destination name and a reference to an object for which the destination applies. This can be supplied, for example, through the GUI or other input, by a test framework, or by reading certain object names from a list, and then instantiating an object based on that name in order to navigate to it. In the user-polling example above, there may be a "create" destination for the poll object, and a "details" destination for the user object. The destinations can define prerequisite(s) for reaching the destination, how the system can check to find out if it is already at the destination, and how to perform the operations to execute the navigation. Functions for this, prerequisite( ) and am_i_here( ), are discussed in more detail below with reference to FIG. 4. In practical application, navigation can be based around a number of navigation operations, which can be implemented as additional functions performed as part of the navigation function. These operations have a relationship defining a prerequisite method which can go to the previous operation if it is determined that the destination is not current for the requested operation. This chaining of operations starting at a first and visiting all the prerequisites in the chain until they are resolved constitutes a complete navigation.

As an example, a processing device in a system can receive a selection of an object, which can be made through the GUI, by a test framework, or by reading an object name from an input file or list. The object is then instantiated if it is not already running. In response to the selection, the processing device retrieves from a register a destination at which the instantiated object is located. The term "register" may be used herein as a noun to refer to the collective destination name associations included in executable computer program code instructions or in a separate file. The term "register" may be used as a verb to refer to the act of creating the associations in either place. The processing device recursively traverses a backwards navigation path from the destination to the GUI using the name of the object and the destination at which the object is located. The processing device can then navigate to the destination using the backwards navigation path.

The register includes destinations and associations with objects. In some examples, to register these associations, a system establishes a plurality of objects that can be instantiated in a test environment, wherein the plurality of objects includes at least one object that may be selected through the GUI as described above. The system receives a plurality of destinations for the plurality of objects, each destination associated with at least one object in the plurality of objects. The system then registers a plurality of associations between the objects and the plurality of destinations and these associations can be part of the computer program code instructions discussed below or can be stored separately.

In some examples, an object to which the navigation is directed can be a component of the GUI itself. As an example, the object may define a specific page or menu in the GUI.

In some examples, all or a portion of context or other information that may be cached during navigation can be deleted after navigating to the destination. As an example, if information related to the navigation path is stored in a memory cache or saved to a computer-readable medium, it can be deleted since it can be recreated at a later time in a relatively fast and efficient manner.

Some aspects of the present disclosure can eliminate the need to rely on context information for navigation, since the context information can be stored by the objects themselves since each navigation object or destination receives a link to the object in question. However, in some examples, context information related to alternative backwards navigation paths can be provided. In such examples, the recursive traversing of the backwards navigation path is accomplished using the context information.

In some examples, the processing device executes a post navigation function, a pre-navigation function, or both. As an example, the pre-navigation function can be designed to check for errors in a selected GUI component. As another example, a pre-navigation function can be designed to check for errors in a current location. As another example, a post navigation function can be designed to check for errors in the destination.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example navigation system for a graphical user interface (GUI). The system is implemented in computing device 100 and includes a processing device 102 that can execute computer program code, also referred to as instructions or program code instructions, for performing operations related to navigating to objects using a GUI in a test environment. Processing device 102 is communicatively coupled to a memory device 104. The processing device 102 can include one processing device or multiple processing devices. Non-limiting examples of the processing device 102 include a field-programmable gate array (FPGA), an application-specific integrated circuit (ASIC), a microprocessor, etc. The processing device 102 can execute one or more operations for navigating to objects from a GUI. The processing device 102 can execute program code instructions 106 stored in the memory device 104 to perform the operations. In some examples, the instructions 106 can include processor-specific instructions generated by a compiler or an interpreter from code written in any suitable computer-programming language, such as C, C++, C#, Python, etc.

Memory device 104 can include one memory device or multiple memory devices. The memory device 104 can be non-volatile and may include any type of memory device that retains stored information when powered off. Non-limiting examples of the memory device 104 include electrically erasable and programmable read-only memory (EE-PROM), flash memory, or any other type of non-volatile memory. In some examples, at least some of the memory device can include a non-transitory computer-readable medium from which the processing device 102 can read instructions 106. A computer-readable medium can include electronic, optical, magnetic, or other storage devices capable of providing the processing device with computer-readable instructions 106 or other program code. Non-limiting examples of a computer-readable medium include magnetic disk(s), memory chip(s), ROM, random-access memory (RAM), an ASIC, a configured processor, optical storage, or any other medium from which a computer processor can read instructions 106.

The memory device 104 can also include one or more files. For example, memory device 104 can serve as a storage device for register 108, including a plurality of destinations, and a plurality of associations between the objects and the destinations. In some examples, the register is a portion of the computer program code instructions discussed above, though could be implemented as a separate file or database. Destinations 110 and the object or objects that are the subject of navigation in some aspects, can also be stored locally in memory device 104. The destinations may be, for example, locations within a file system that defines how memory device 104 is organized. In some aspects, information 112 that is cached for a particular navigation may also be stored in memory device 104, either temporarily or for as long as the system is running.

Figure 2:
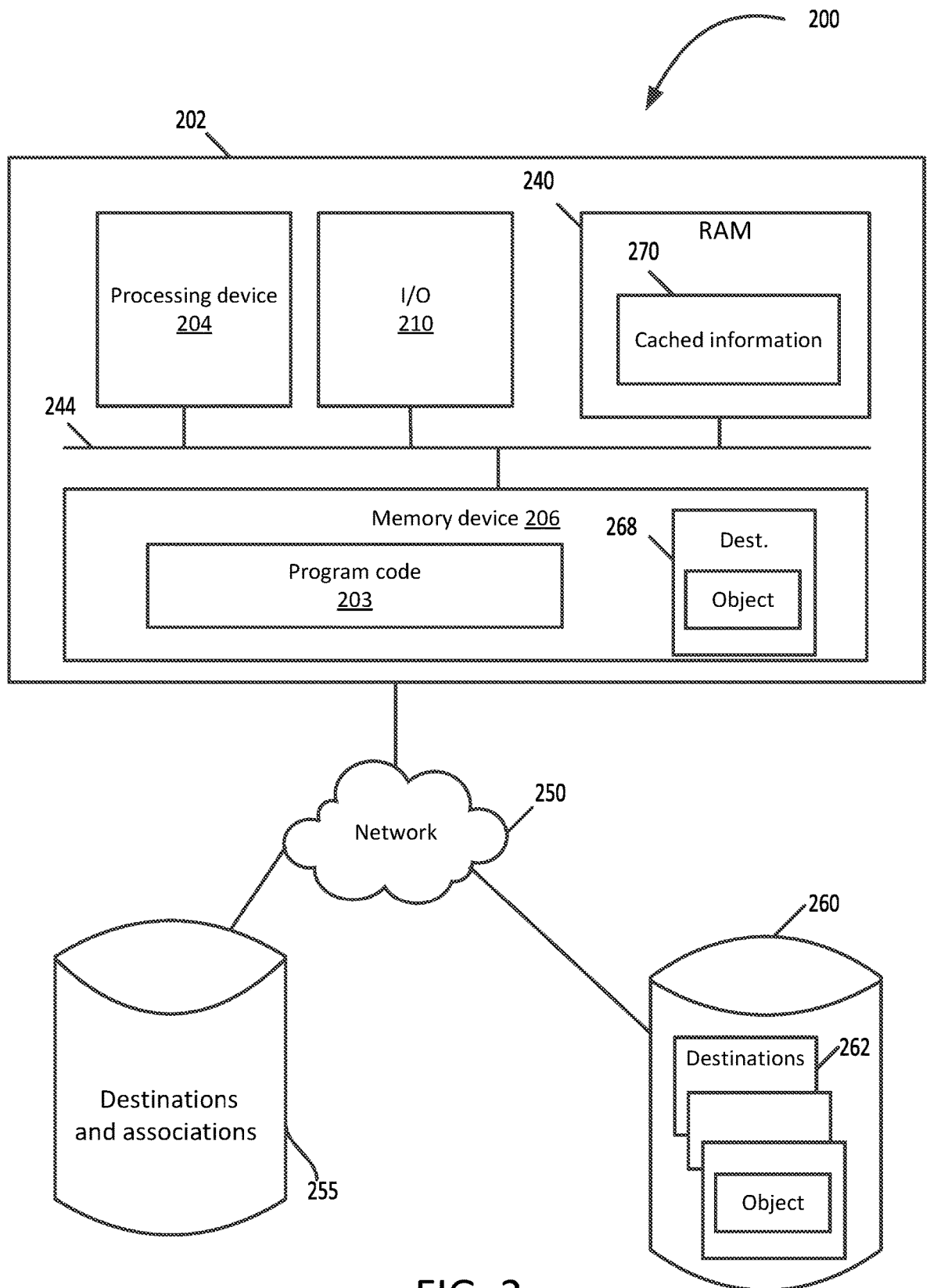
FIG. 2 is a block diagram of a navigation system for a GUI according to some aspects.

FIG. 2 is a navigation system 200 for a GUI according to some aspects. More specifically, the system 200 includes a computing device 202. Examples of the computing device 202 can include a server, laptop computer, desktop computer, or any combination of these. The computing device 202 can execute computer program code instructions, which can be software for navigating to objects from a GUI that works in part by recursively traversing a backwards path from a destination to a current location. Software can include computer-readable instructions that are executable by a processing device 204, such as program code instructions 203. The system can be programmed in any suitable programming language, such as Java, C++, C, Python, or any combination of these.

In FIG. 2, computing device 202 includes a processing device 204, memory device 206, an input/output (I/O) module or modules 210, and a random access memory (RAM) 240. As can be further seen, a bus and/or interconnect 244 is also provided to allow for inter- and intra-device communications using, for example, I/O module 210. I/O module 210 can include a network interface (not shown), which in turn communicates with network 250. Processing device 204 can include one processing device or multiple processing devices. Non-limiting examples of the processing device 204 include a field-programmable gate array (FPGA), an application-specific integrated circuit (ASIC), a microprocessor, etc. The processing device 102 can execute one or more operations for navigating to objects from a GUI.

Non-limiting examples of the memory device 206 include electrically erasable and programmable read-only memory (EEPROM), flash memory, or any other type of non-volatile memory. In some examples, at least some of the memory device can include a non-transitory computer-readable medium from which the processing device 204 can read program code instructions 203. A computer-readable medium can include electronic, optical, magnetic, or other storage devices capable of providing the processing device with computer-readable instructions or other files. Non-limiting examples of a computer-readable medium include magnetic disk(s), memory chip(s), ROM, random-access memory (RAM), an ASIC, a configured processor, optical storage, or any other medium from which a computer processor can read instructions Still referring to FIG. 2, network 250 can connect computing device 202 to storage devices 255 and 260. In the example of FIG. 2, storage device 255 includes a plurality of destination names, and a plurality of associations between the objects and the destination names. These objects, destinations and associations can be registered in a remotely located portion of the program code or may be stored in a separate file or database. Storage device 260 includes destinations 262 with objects to which the system is to navigate. In this particular example, at least one destination 268 with an object is incorporated in the file system of memory device 206. Although FIGS. 1 and 2 depict a certain arrangement of components for illustrative purposes, other examples can include any number and combination of these components arranged in any suitable configuration.

In the example of FIG. 2, cached context or other information 270 may be stored in RAM 240 once a navigation has been carried out. Optionally, after navigating to a destinations (e.g., destination 262 or destination 268) using the backwards navigation path, the cached information 270 can be deleted from RAM 240 by processing device 204.

Figure 3:
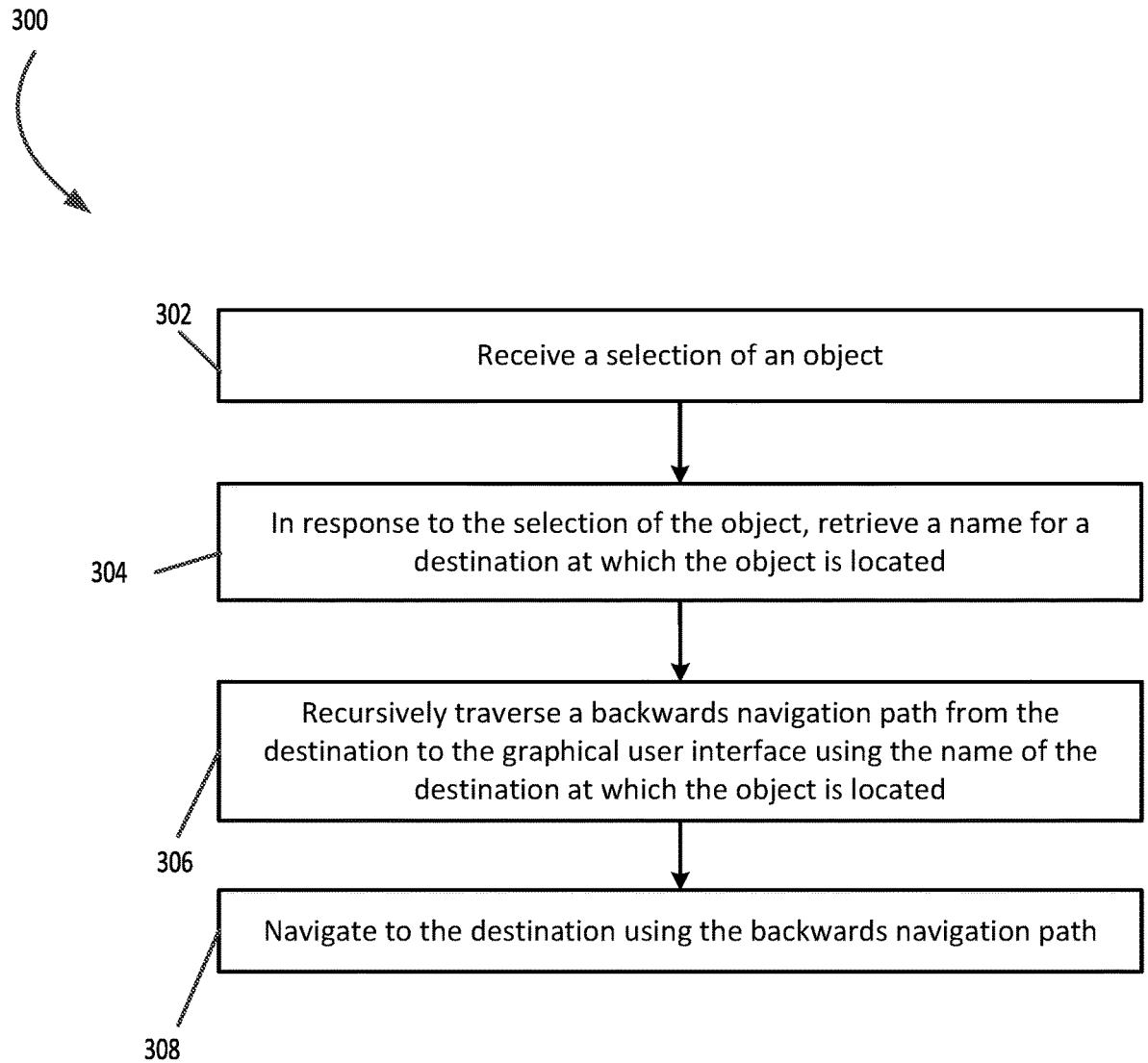
FIG. 3 is a flowchart of an example process for navigating to a destination from a GUI according to some aspects.

In some examples, a computing device (e.g., computing device 100 or computing device 202) can perform one or more of the operations shown in FIG. 3 to perform the navigation. In other examples, the computing device can implement more operations, fewer operations, different operations, or a different order of the operations depicted in FIG. 3. Process 300 of FIG. 3 is described below with reference to components discussed above.

In block 302 of FIG. 3, the computing device receives a selection of an object. If the object is not already running, the object is instantiated. In block 304, in response to the selection, the computing device retrieves a destination at which the object is located. The objects, destination names, and associations can be part of the program code, instructions, or software discussed with respect to FIG. 1 and FIG. 2 and can be located in a memory device, such as memory devices 104 or memory device 206, or in a storage device connected to a network such as storage device 255. The register of destination names and associations can also reside in both places for redundancy or spanning. At block 306, the computing device recursively traverses a backwards navigation path from the destination to the GUI. At block 308, the computing device navigates to the destination using the backwards navigation path. Some or all of these steps are described in greater detail below.

Figure 4:
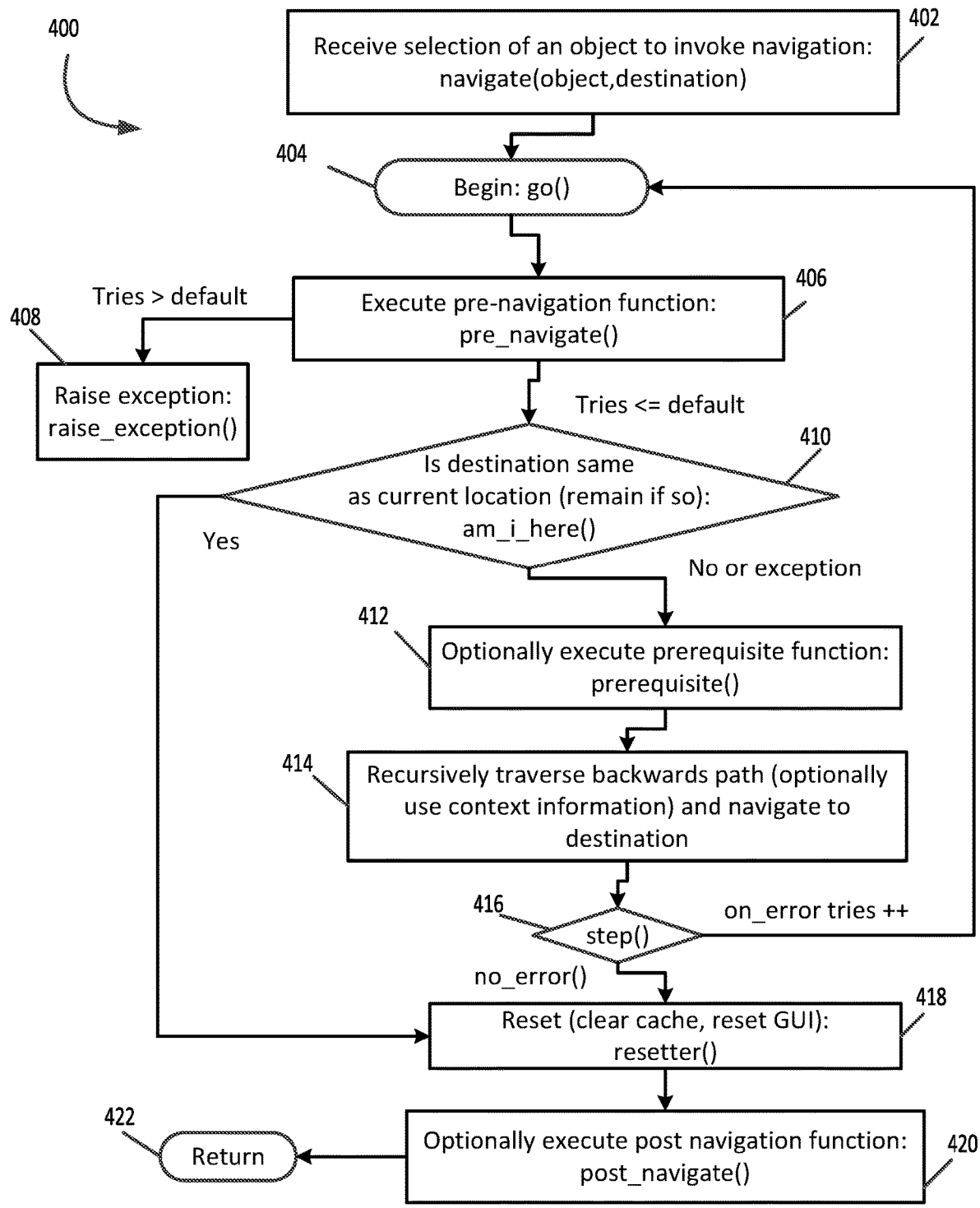
FIG. 4 is a flowchart of an example process for navigating to a destination from a GUI according to some aspects.

FIG. 4 is a flowchart of an example of a process 400 for navigating to an object from a GUI according to some aspects. This process 400 can be carried out by a computing device or processor as illustrated in FIG. 1 or 2. In some examples, the process 400 can include more operations, fewer operations, different operations, or a different order of the operations depicted in FIG. 4.

The process 400 begins at block 402 when a processor or computing device in the system receives a selection of an object to invoke a navigation. As previously discussed, this object could be a component of the GUI itself, a server object, user object, etc., and is instantiated if it is not already running. In this example, the navigation function, navigate (object, destination) is initialized and the process begins using a go( ) function at block 404. At block 406, a pre-navigation function (pre_navigate( )) is optionally executed. Such a function can check for errors the current location to which the GUI is pointed, check for on-screen errors, or check for other errors, such as too many retries being attempted, as illustrated in FIG. 4 by the alternative process directions from block 410. If an error is found, the process 400 can proceed to block 408 where a function to raise the exception, raise_exception( ), is executed. Other navigation destination objects can follow a similar structure, omitting or including sections as needed.

At block 410 of FIG. 4, a determination is optionally made as to whether the destination at which the object is located is the same as the current location to which the GUI is directed. Based on this determination, the GUI may remain directed to current location. Thus, if the answer is yes, the GUI can remain in its current location state, and the navigation portion of process 400 described below can be skipped. In this example, the function which makes this determination is referred to as am_i_here( ). If the answer is no, or if there is an exception, processing proceeds to block 412 where an optional prerequisite function can be executed. This prerequisite function can carry out any prerequisite operations for reaching the selected object at its destination. In this example, the function is referred to as pre_requisite ( ). Often a prerequisite will include navigating to a destination on the same or another object. For example, if a GUI component is the object of interest, and the GUI component is, for example, a details page, there may be a prerequisite to first navigate to a user object if the information to be presented in the details page are details of the user object. In some examples, block 412 and 414 would be combined as where there IS a prerequisite, the recursion takes place there as this prerequisite will ordinarily call navigation on another object/destination pair.

Still referring to FIG. 4, navigation takes place at block 414, where a computing device recursively traverses a backwards path to navigate to the destination. The navigation object uses the destination name and works backwards from a destination as opposed to working towards the destination. In a typical GUI with multiple interface components, for example, the navigation object being executed by a computing device or processing device starts at a destination, navigates to a previous menu, determines if the previous menu is the current location, and repeats if necessary, recursively traversing a backwards navigation path. This process can be carried out quickly for each navigation. Thereafter, the GUI can forward navigate through the backwards navigation path to arrive at the destination. This traversing of a backwards navigation path and then following the backwards navigation path to the destination constitutes a complete navigation. The navigation operations subclass the navigation object.

In some examples, context information related to alternative backwards navigation paths can be received and used during navigation. Such context information may alternatively be used to create different virtual destinations corresponding to different paths, eliminating the need to use context information. Additional parameters might also be used to provide context. Context or other parameters can also be acquired through the GUI when various GUI components are activated or selected.

Continuing with FIG. 4, step function 416, step ( ), represents action taken relative to the object at the destination. For example, this operation may be opening or accessing a GUI component or importing information used by the object to carry out its normal task. In the example of FIG. 4, an error can be flagged if too many retries occur for this function. If there is no error, the system can optionally be reset at block 418. A function carrying out this reset can be referred to as resetter( ). The resetter function can cause the computing device to delete cached information that may remain in memory. The optional resetter can also be used for the situation where the GUI needs to be in a certain state for navigation to continue. For example, imagine a system has two views when listing objects (grid or list), but the testing framework only knows how to interact with the "grid" format. The resetter can used so that upon landing on the list page the page may be reset (i.e. the "grid" button clicked) to ensure that the page is in the right "format" for the next navigation or testing framework to use. The resetter could be instituted as part of the post_navigate( ) function, discussed below.

At block 420 of FIG. 4, a post navigation function, post_navigate( ), can optionally be executed. This function can check for errors at the destination to which the system just navigated, or check for other errors such as the GUI being left in an unacceptable state. The post navigation function can complement the pre-navigation function so that the post navigation function, the pre-navigation function, or both include(s) checking for various errors at various parts of the process. As mentioned above, the resetter could be instituted as part of the post_navigate( ) function, but the intention of the post_navigate( ) function in this example is for the function to generally not be overridden at the navigation destination level to allow for system wide post navigation while allowing destination level resetting to occur. Process 400 ends at block 422, where the system returns to waiting to receive another selection of an object.

Figure 5:
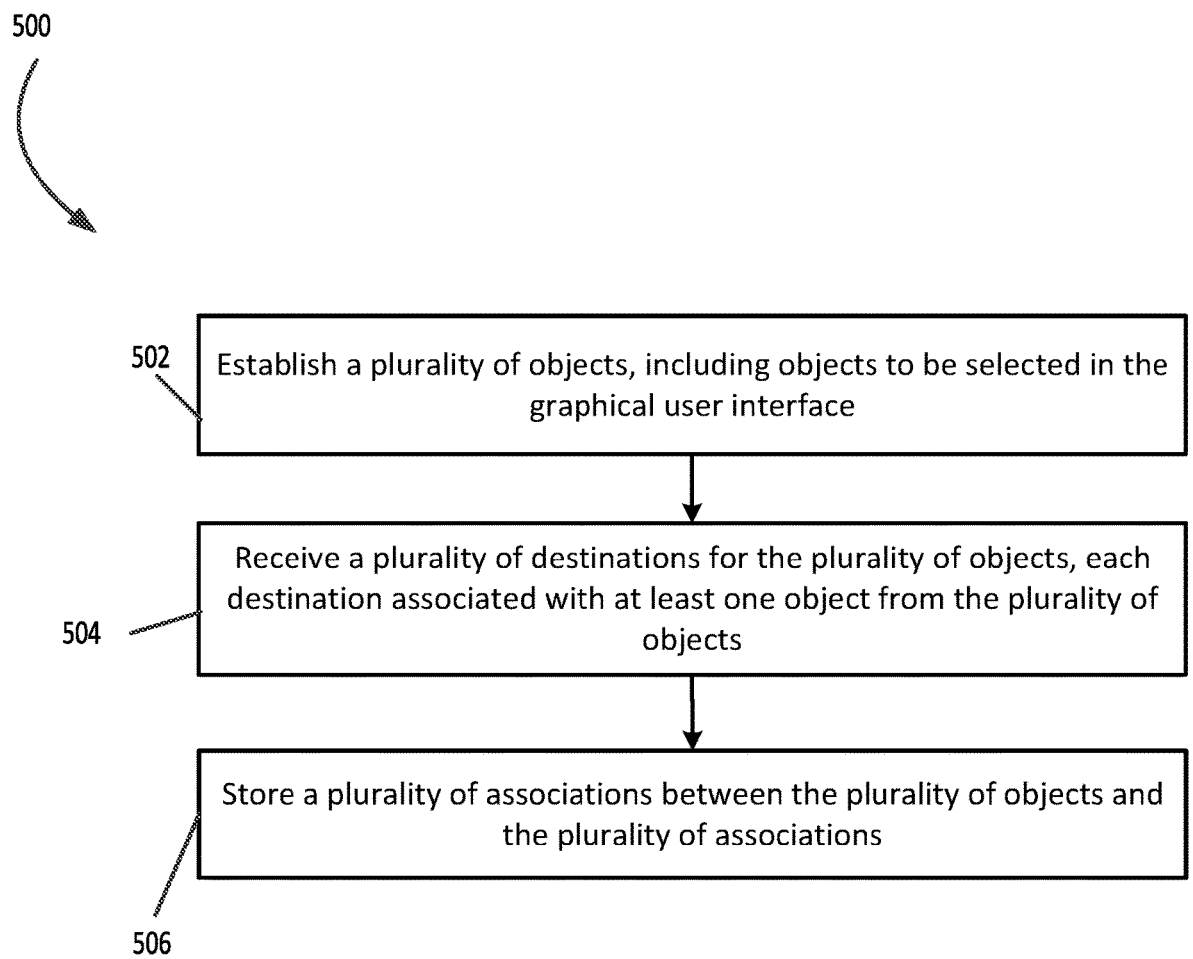
FIG. 5 is a flowchart of an example of a process for registering objects with destinations according to some aspects.

In some examples, a computing device can perform one or more of the operations shown in FIG. 5 to store information in the register, which in this example is a portion of the computer program code instructions or software for navigating to objects from the GUI as referred to in FIG. 1 and FIG. 2. In other examples, the computing device can implement more operations, fewer operations, different operations, or a different order of the operations depicted in process 500 of FIG. 5. In some examples, the register is established well in advance of actually testing a GUI, making use of a different computing device.

In block 502 of FIG. 5, a computing device establishes a plurality of objects, wherein the plurality of objects include objects that may need be to selected in the GUI in order to test the GUI. In some examples, these objects mimic real-world objects and are instantiated as part of a test framework. In some examples, computer program code for these objects is part of the computer program code instructions or software as referred to in FIG. 1 and FIG. 2. In block 504, the computing device receives a plurality of destinations for the plurality of objects. Each destination is associated with at least one object in the plurality of objects. At block 506, the computing device registers a plurality of associations between the plurality of objects and the plurality of destinations.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
receiving a selection of a plurality of objects in a graphical user interface in a test environment;
in response to the selection, retrieving names for destinations in the test environment at which the objects are located;
recursively accessing, for each object of the plurality of objects and its destination, at least one prerequisite destination along a navigation path from the destination of the object in the test environment to the graphical user interface using the name for the destination in the test environment at which the object is located to establish the navigation path to the object in the test environment; and
navigating, for each object of the plurality of objects, to its destination using the navigation path in the test environment.

2. The system of claim 1 wherein the operations performed by the processing device further comprise registering a plurality of associations, each association between the object and its destination.

3. The system of claim 1 wherein the operations performed by the processing device further comprise:
determining that the destination at which the object is located is the same as a current location to which the graphical user interface is directed; and
based on determining that the destination at which the object is located is the current location, remaining at the current location in the graphical user interface.

4. The system of claim 1 wherein at least some of the plurality of objects comprise a component of the graphical user interface.

5. The system of claim 1 wherein the operations performed by the processing device further comprise deleting cached information after navigating to the destination.

6. The system of claim 1 wherein the operations performed by the processing device further comprise receiving context information related to alternative navigation paths, wherein the recursively accessing at least one prerequisite destination along the navigation path comprises using the context information.

7. The system of claim 1 wherein the operations performed by the processing device further comprise executing at least one of a post navigation function or a pre-navigation function, wherein the at least one of the post navigation function or the pre-navigation function includes checking for errors in at least one of a current location or the destination.

8. A method comprising:
receiving, by a computing device, a selection of a plurality of objects in a graphical user interface in a test environment;
in response to the selection, retrieving, by the computing device, names for destinations in the test environment at which the objects are located;
recursively accessing, by the computing device, for each object of the plurality of objects and its destination, at least one prerequisite destination along a navigation path from the destination of the object in the test environment to the graphical user interface using the name for the destination in the test environment at which the object is located to establish the navigation path to the object in the test environment; and
navigating, by the computing device, for each object of the plurality of objects, to its destination using the navigation path in the test environment.

9. The method of claim 8 further comprising registering a plurality of associations, each association between the object and its destination.

10. The method of claim 8 further comprising:
determining that the destination at which the object is located is the same as a current location to which the graphical user interface is directed; and
based on determining that the destination at which the object is located is the current location, remaining at the current location in the graphical user interface.

11. The method of claim 8 further comprising deleting cached information after navigating to the destination.

12. The method of claim 8 further comprising receiving context information related to alternative navigation paths, wherein the recursively accessing at least one prerequisite destination along the navigation path comprises using the context information.

13. The method of claim 8 further comprising executing at least one of a post navigation function or a pre-navigation function, wherein the at least one of the post navigation function or the pre-navigation function includes checking for errors in at least one of a current location or the destination.

14. A non-transitory computer-readable medium comprising program code that is executable by a processing device for causing the processing device to:
receive a selection of a plurality of objects in a graphical user interface in a test environment;
in response to the selection, retrieve names for destinations in the test environment at which the objects are located;
recursively access, for each object of the plurality of objects and its destination, at least one prerequisite destination along a navigation path from the destination of the object in the test environment to the graphical user interface using the name for the destination in the test environment at which the object is located to establish the navigation path to the object in the test environment; and
navigate, for each object of the plurality of objects, to its destination using the navigation path in the test environment.

15. The non-transitory computer-readable medium of claim 14, further comprising program code that is executable by the processing device for causing the processing device to store, in a database, a plurality of associations, each association between a name for one of the plurality of objects and its destination in the test environment.

16. The non-transitory computer-readable medium of claim 14, further comprising program code that is executable by the processing device for causing the processing device to:
determine that the destination at which the object is located is the same as a current location to which the graphical user interface is directed; and
based on determining that the destination at which the object is located is the current location, remain at the current location in the graphical user interface.

17. The non-transitory computer-readable medium of claim 14, wherein at least some of the plurality of objects comprise a component of the graphical user interface.

18. The non-transitory computer-readable medium of claim 14, further comprising program code that is executable by the processing device for causing the processing device to delete cached information after navigating to the destination.

19. The non-transitory computer-readable medium of claim 14, further comprising program code that is executable by the processing device for causing the processing device to receive context information related to alternative navigation paths, wherein the recursively accessing at least one prerequisite destination along the navigation path comprises using the context information.

20. The non-transitory computer-readable medium of claim 14, further comprising program code that is executable by the processing device for causing the processing device to execute at least one of a post navigation function or a pre-navigation function, wherein the at least one of the post navigation function or the pre-navigation function includes checking for errors in at least one of a current location or the destination.

\* \* \* \* \*